United States Patent [19]

Fujimoto

[11] 3,927,256

[45] Dec. 16, 1975

[54] VARIABLE-RATE DRIVE MECHANISM FOR A FACSIMILE HEAD OR THE LIKE

[75] Inventor: Sakae Fujimoto, Chofu, Japan

[73] Assignee: Ricoh Co., Ltd., Tokyo, Japan

[22] Filed: Dec. 26, 1974

[21] Appl. No.: 536,390

[30] Foreign Application Priority Data

Dec. 29, 1973 Japan .................................. 48-3659

[52] U.S. Cl. .................... 178/7.6; 178/7.1; 178/6.7; 178/6; 178/5; 178/DIG. 7; 178/DIG. 27; 74/424.8 A

[51] Int. Cl.² .............................................. H04N 1/06

[58] Field of Search .............. 178/7.1, 6.6 SF, 6.6 P, 178/6, 7.6, DIG. 7, DIG. 27, 5, 6.7; 74/424.8 A

[56] References Cited

UNITED STATES PATENTS

| | | | |
|---|---|---|---|
| 3,201,512 | 8/1965 | Mason | 178/6 |
| 3,288,925 | 11/1966 | Moe | 178/6.7 |
| 3,764,741 | 10/1973 | Long | 178/7.6 |

*Primary Examiner*—Robert L. Griffin
*Assistant Examiner*—Edward L. Coles
*Attorney, Agent, or Firm*—Cooper, Dunham, Clark, Griffin & Moran

[57] ABSTRACT

A feed mechanism for driving a facsimile head at a fixed rate in meshed engagement with a rotatable threaded shaft includes a mechanism for selectably driving the facsimile head to skip a selected number of shaft threads and move at a more rapid rate, to thereby scan quickly through blank areas of a decimal.

6 Claims, 9 Drawing Figures

VARIABLE-RATE DRIVE MECHANISM FOR A FACSIMILE HEAD OR THE LIKE

BACKGROUND OF THE INVENTION

The invention relates to a feed mechanism for a moving article which is normally driven at a fixed speed by engagement with a threaded shaft and which may be rapidly driven to provide desired skip operations. More specifically, the invention relates to a variable-rate drive mechanism for a facsimile head.

In a facsimile transmitter and receiver, the facsimile head is driven to scan an original or to produce a record on a recording paper. One inexpensive facsimile transmitter and receiver employs a rotating drum and a head which scans the drum by moving axially therealong at a single, stead rate. There are no provisions for skipping over areas having no information. In a more sophisticated facsimile machine, a skip operation is initiated in response to a proper signal to turn on a pulse motor for selectively driving the head at a faster rate. However, this method suffers a substantial drawback in that the needed pulse motor is expensive. A need thus exists for a transmitter and receiver of the drum type in which the head is completely mechanically driven and in which a skip operation is economically provided.

SUMMARY OF THE INVENTION

An object of the invention is to provide a variable-rate drive mechanism for a facsimile head or the like which is inexpensive to manufacture, has a relatively simple construction and is primarily mechanical in operation.

To these and other ends, the present invention provides a feed mechanism for driving a moving article such as a facsimile head in which the drive mechanism is mechanical, the basic driving member is a threaded shaft, and a mechanical skip operation is provided. In accordance with the invention, the feed mechanism has a rotatable threaded shaft which normally drives the moving article at a fixed forward rate. When it is desired to have the moving article skip a selected portion of the threaded shaft, the article is advanced over a selected number of threads by a mechanical rapid advance mechanism. The rapid advance mechanism is activated by an electrical signal, and each time the activating means is energized the mechanical rapid advance mechanism causes the moving article to rapidly skip over the same selected number of threads.

When the moving article is a facsimile head, the head starts scanning at an initial position and is propelled toward a final position at a fixed rate by the rotating threaded shaft. Each time a skipping operation is desired, the activating means is energized and the head is disengaged from the shaft and is rapidly moved along a portion of the shaft to skip a selected number of threads, whereupon it again engages the shaft, provided the final head provision has not been reached. When the end position of the head is reached, the head is automatically and rapidly returned to the initial position, and a new scan starts. In this manner, for both transmitting and receiving, the facsimile head can rapidly skip over drum portions having no information.

DETAILED DESCRIPTION

Figure 1:
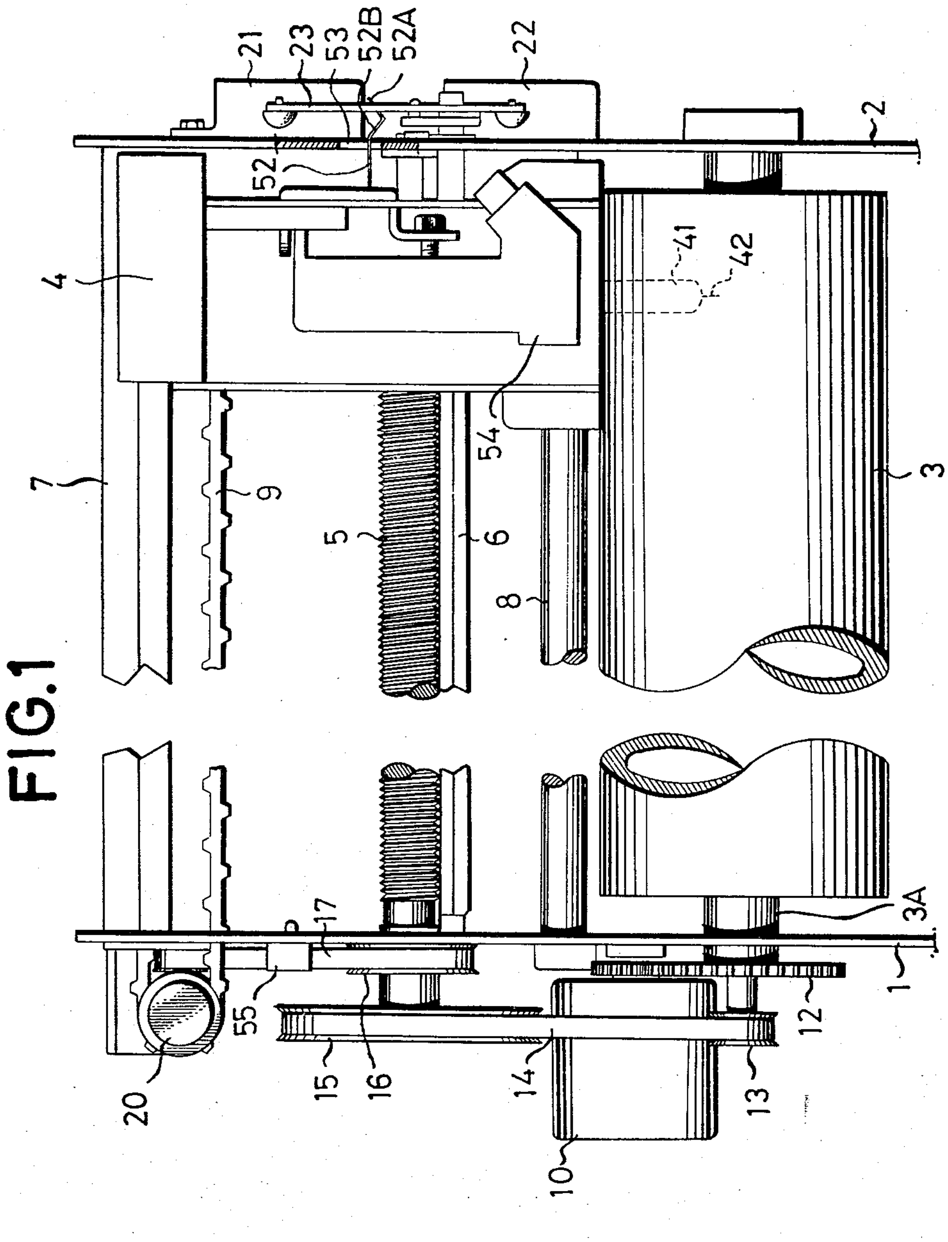
FIG. 1 is a simplified front view of a drum type facsimile transmitter and receiver in accordance with the invention.

Referring to FIG. 1, there is shown a pair of sideplates 1 and 2 across which extends a drum 3 for receiving an original to be read or a paper to be printed upon, a threaded shaft 5 on which a facsimile head 4 moves, a control rod 6, a stanchion 7 across the sideplates 1 and 2, and a guide axle 8 for the head 4. Also extending parallel to the stanchion 7 and between the sideplates 1 and 2 is a belt 9 for returning the head 4 to an initial position.

Figure 2:
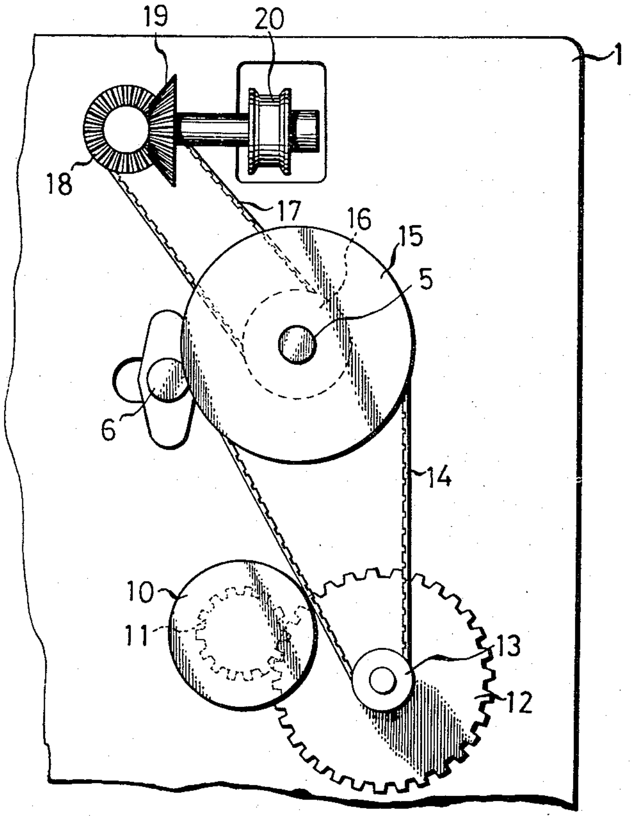
FIG. 2 is a partial left side view of the transmitter and receiver of FIG. 1, illustrating a motorized belt drive mechanism.

Referring to FIGS. 1 and 2, a drive motor 10 is mounted on the outboard side of the sideplate 1 for driving a shaft 3A of the drum 3 through a train of reduction gears 11 and 12. A pulley 13 is fixed on a shaft 3A for rotatively driving the threaded shaft 5 through a timing belt 14 and a pulley 15. The shaft 3A of the drum and the threaded shaft 5 are driven for rotation at a ratio of 4:1. Another pulley 16 is fixed on the shaft 5 and is coupled through a timing belt 17 with a bevel gear 18 for rotating the latter. Another bevel gear 19 meshes with the bevel gear 18, whereby a pulley 20 fixedly mounted on the shaft of the bevel gear 19 is rotated. The head returning belt 9 extends around the pulley 20.

Figure 3:
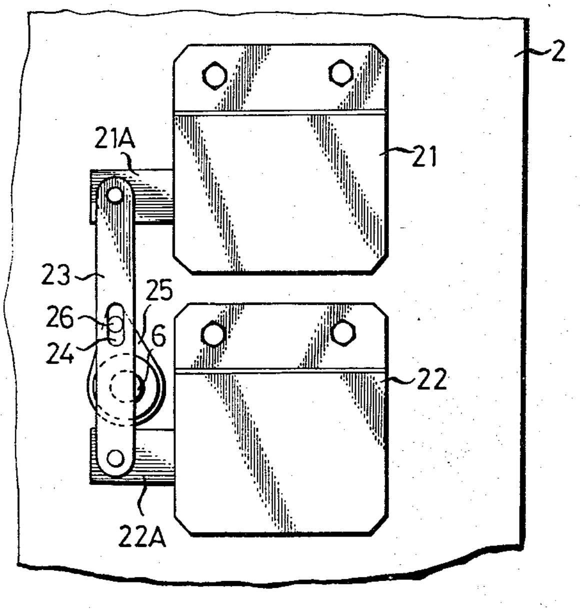
FIG. 3 is a partial right side view of the transmitter and receiver of FIG. 1, illustrating a control mechanism.

Referring to FIGS. 1 and 3, a pair of solenoids 21 and 22 are mounted on the outboard side of sideplate 2, and have their respective plungers 21A and 22A pivotally connected with a connecting rod 23. The connecting rod 23 is formed with a slit 24 substantially at the center of its length, which is engaged by a pin 26 of a crank 25 which is fixedly mounted on an end of the control rod 6. The connecting rod 23 and the associated control rod 6 assume a home position when both solenoids are energized. When either solenoid 21 or 22 is deenergized, the connecting rod 23 assumes a first shift position, and the control rod 6 a first angular position through the movement of the pin 26 and the crank 25. When both solenoids 21 and 22 are deenergized, the connecting rod 23 assumes a second shift position and the control rod 6 a second angular position.

Figure 4:
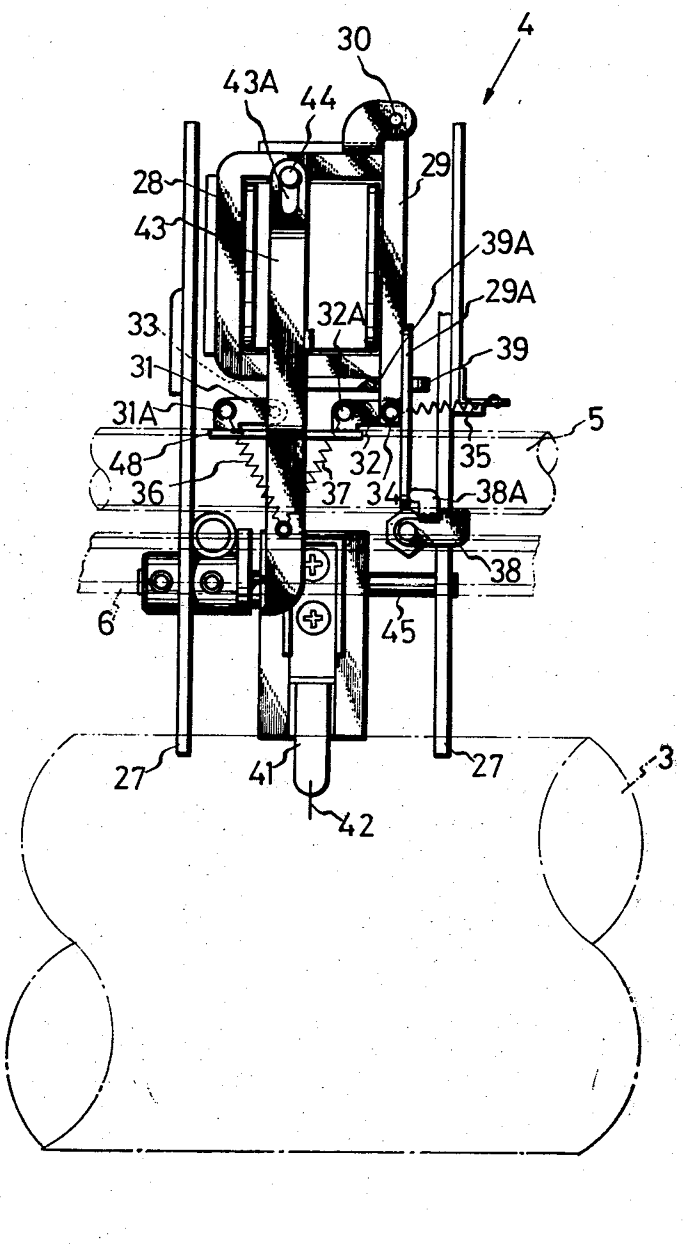
FIG. 4 is a rear view of a facsimile head in accordance with the invention.
Figure 5:
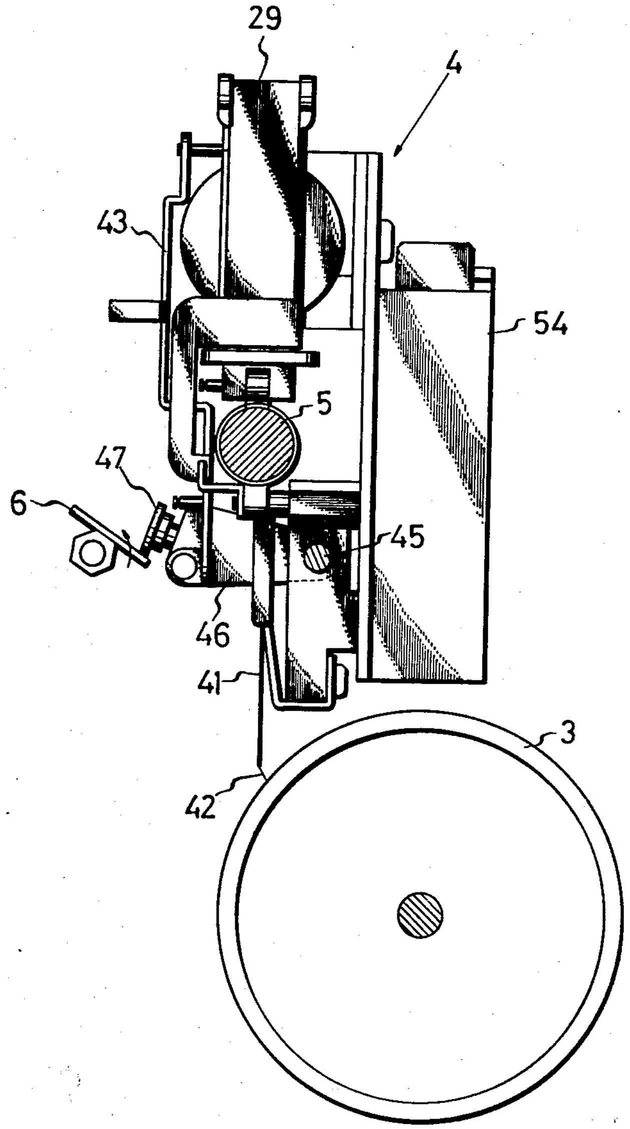
FIG. 5 is a side view of a facsimile head in accordance with the invention.
Figures 6, 7:
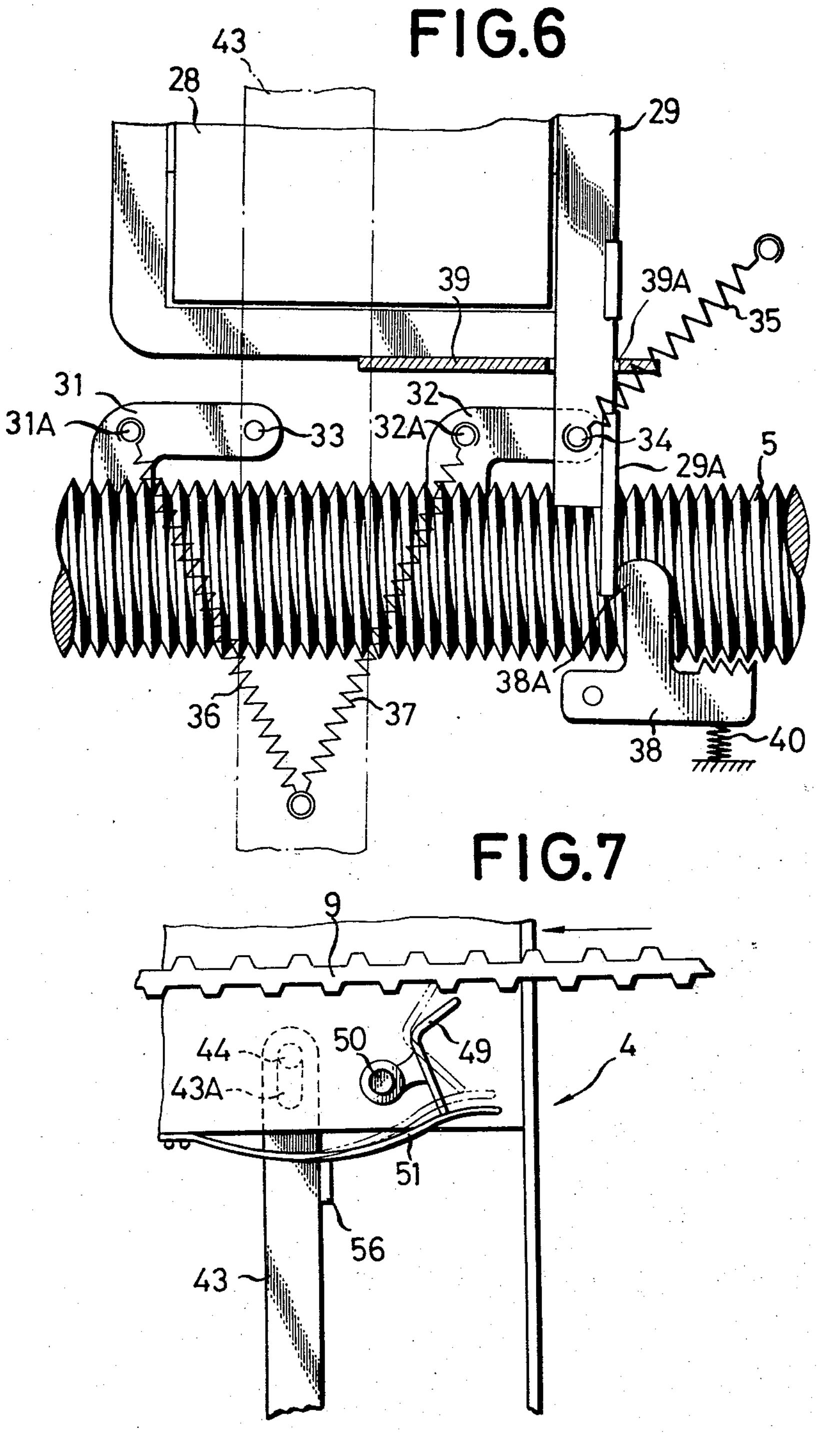
FIG. 6 is a simplified and enlarged view of a portion of FIG. 4.
FIG. 7 is a partial schematic view illustrating a head returning mechanism in accordance with the invention.

Referring to FIGS. 4 and 5, the facsimile head 4 includes a frame 27 on which an electromagnet 28 is fixedly mounted, and a lever 29 which forms an armature for the electromagnet 28 is pivotally mounted on the upper end of the frame at 30. A pair of halfnuts 31 and 32 which mesh with the thread on the threaded shaft 5 are pivotally connected with the frame 27 and with the lever 29 at positions 33 and 34, respectively. The halfnuts 31 and 32 carry pins 31A and 32A. Springs 35, 36 and 37 extend between stationary points on the frame 27 and the point of pivotal connection 34 between the halfnut 32 and the lever 29 as well as between the frame 27 and the pins 31A and 32A. These springs bias the lever 29 and the halfnuts 31, 32 to rotate counterclockwise about their point of pivotal connection, so that the halfnuts 31 and 32 are urged into engagement with the threaded shaft 5. As indicated in FIG. 6, a halfnut 38 is pivotally mounted on the frame 27 at a position opposite to the halfnuts 31 and 32 with respect to the threaded shaft 5, and has an extension 38A which cooperates with a lower extension 29A of the lever 29 to control the engagement between the halfnut 38 and the threaded shaft 5. The lever 29 extends through a slit 39A formed in a support plate 39 which is secured to the frame 27, whereby the rotational displacement of the lever 29 about its point of pivotal connection 30 is limited, as will be described below. The halfnut 38 is associated with a compression spring 40 which biases it in a counterclockwise direction to urge the halfnut 38 into engagement with the threaded shaft 5.

Referring to FIGS. 1, 4 and 5, a stylus support 41 carries a stylus 42 which is shown in operating position in contact with drum 3. When the apparatus shown is to be used as a receiver, a recording paper is wrapped around the drum 3 and a voltage corresponding to the image of an original scanned in a transmitter is applied to the stylus 42, whereby an image corresponding to that of the original is recorded on the paper wrapped around the drum 3.

An operating member 43 is slidably mounted on the head 4 so as to be displaceable longitudinally through a connection which is formed by a slit 43A (FIG. 7) in member 43 and a pin 44 secured to the frame 27. As shown in FIG. 5, the operating member 43 is connected with a lever 46 secured to a pivot 45 which is pivotally mounted on the frame 27, the lever 46 carrying a roller 47 which bears against the control rod 6. Consequently, as the control rod 6 rotates in the direction shown by the arrow in FIG. 5, the operating member 43 will move upwardly from its lowermost position shown in FIG. 5. The stylus support 41 is secured to the pivot 45, so that when the operating member 43 assumes an intermediate position, the stylus support 41 will rotate together with the pivot 45, moving its stylus 42 away from the drum 3.

As indicated in FIG. 4, a transverse plate 48 is secured to the operating member 43 and is located so as to be engageable with the pins 31A and 32A on the halfnuts 31 and 32, respectively. However, the transverse plate 48 does not engage with the pins 31A and 32A in the intermediate position of the operating member 43, but engages with these pins only when the operating member 43 has moved further up to a second raised position, thereby turning halfnuts 31 and 32 about their points of pivotal connections 33 and 34 to disengage them from the threaded shaft 5. This second, uppermost position is the home position of the operating member 43.

FIG. 7 shows a returning pawl 49 pivotally mounted at 50 to the top of the frame 27 of the head 4. A horizontally extending leaf spring 51 is secured to the frame 27, with its free end engaging pawl 49, and a control projection 56 is secured to the operating member 43. When the operating member 43 assumes a lower position, the pawl 49 rotates clockwise and bears against the leaf spring 51 in the position shown in solid lines as a result of its own gravitational force, whereby it is removed from the returning belt 9, while the latter normally rotates in the direction indicated by the arrow on the section of the belt shown in FIG. 7. When the operating member 43 is moved to its uppermost position, the control projection 56 connected with the operating member 43 will be moved upward, causing the leaf spring 51 to rotate the pawl 49 counterclockwise about its pivot 50, thus displacing it to the position shown in broken lines. In this position, the pawl 49 engages with a recess in the belt 9, and the belt 9 rapidly returns the printer head 4 to the left, as viewed in FIG. 7, which is toward its original position, as shown in FIG. 1.

Figure 8:
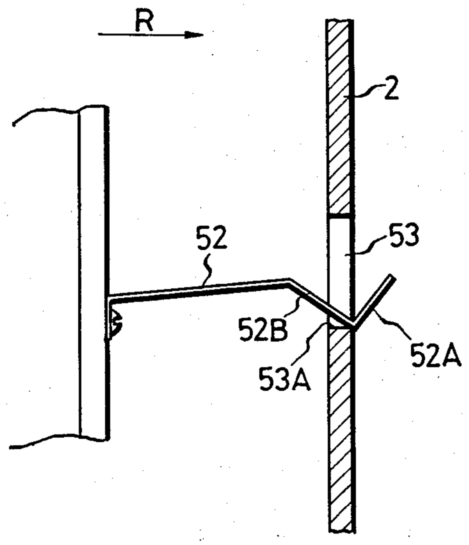
FIG. 8 is a partial schematic view illustrating a head halting mechanism in accordance with the invention.

Referring to FIGS. 1 and 8, the frame 27 of the head 4 has a horizontal leaf spring 52 which extends outwardly from the frame, and an opening 53 is formed in the sideplate 2 at a position opposite to the leaft spring 52. As shown, the free end of the leaf spring 52 is bent into a V-configuration, including a first ramp 52A and a second ramp 52B. When the printer head 4 returns to its original position as a result of the engagement of the returning pawl 49 with the belt 9, initially the first ramp 52A of the leaf spring 52 will bear against the lower edge 53A of the opening 53, which raises the first ramp upward as it moves to the right. When the intersection point between the first and second ramps 52A and 52B moves past the lower edge 53A, the returning pawl 49 will have moved past the belt 9 to be disengaged therefrom, and the second ramp 52B will bear against the lower edge 53A as shown in FIG. 8. At this time, the leaf spring 52, which has been raised, will exert a pressure upon the lower edge 53A through the second ramp 52B, and the horizontal component of such pressure causes the printer head 4 to be moved rapidly in the returning direction, which is the direction indicated by the arrow labelled R in FIG. 8. Thus the printer head 4 will move through the position at which the pawl 49 is disengaged from the belt 9 to reach its original position, where it comes to a stop.

In FIGS. 1 and 5, numeral 54 represents an optical reader of the reflection type which is mounted on the head 4. The optical reader is of conventional construction, well known in the art, and therefore will not be specifically described herein. Numeral 55 represents a switch for detecting the terminal position of the printer head 4.

When the apparatus is used as a receiver, the optical reader 54 does not operate. Before printing starts, the head 4 is in its original position, with both solenoids 21 and 22 energized, so that the operating memher 43 is in its uppermost position. Thus, the stylus 42 is removed from the paper (not shown) disposed around the drum 3, and the halfnuts 31 and 32 are disengaged from the threaded shaft 5. Because the lever 29 is removed from the electromagnet 28, the cooperation of the lower extension 29A of the lever 29 and the extension 38A of the halfnut 38 causes the halfnut 38 to be disengaged from the threaded shaft 5. As the drive motor 10 rotates, the drum 3 and the threaded shaft 5 also rotate, causing the returning belt 9 to run. When a start signal is received, solenoids 21 and 22 are deenergized, and the control rod 6 causes the operating member 43 to assume its lowermost position, causing, halfnuts 31 and 32 to engage with the threaded shaft 5 and causing the stylus 42 to bear against the paper on the drum 3. Then the head 4 starts to move to the left in FIG. 1, while the drum 2 rotates, and an image is formed on the paper disposed around the drum 3 by means of the stylus 42 which is supplied with a voltage corresponding to the image of an original being scanned. When the head 4 reaches its terminal position, completing the scanning, it activates the detection switch 55, whereupon the solenoids 21 and 22 are energized again, causing the control rod 6 to displace the operating member 43 to its uppermost position, thus disengaging the halfnuts 31 and 32 from the threaded shaft 5 and moving the stylus 42 away from the drum 3. As described previously in connection with FIG. 7, the returning pawl 49 engages the belt 9 at this time, whereby the head 4 is rapidly returned to its initial position. The belt 9 terminates slightly in advance of the position corresponding to the initial position of the head 4, and therefore the engagement between the pawl 49 and the belt 9 is terminated at such position. Subsequently, the head 4 is advanced to its initial position and retained therein by the cooperation of the leaf spring 52 and the opening 53 in the sideplate 2, as previously described in connection with FIG. 8.

When the apparatus is used as a transmitter, one of the solenoids shown in FIG. 3, for example, solenoid 22, is normally energized so that the control rod 6 assumes its first angular position and the operating member 43 assumes its intermediate position. As a consequence, the stylus 42 is normally removed from the drum 3, but the halfnuts 31 and 32 and the returning pawl 49 remain in the same position as the receiver mode. The optical reader 54 operates to read an image of an original disposed around the drum 3.

Figure 9:
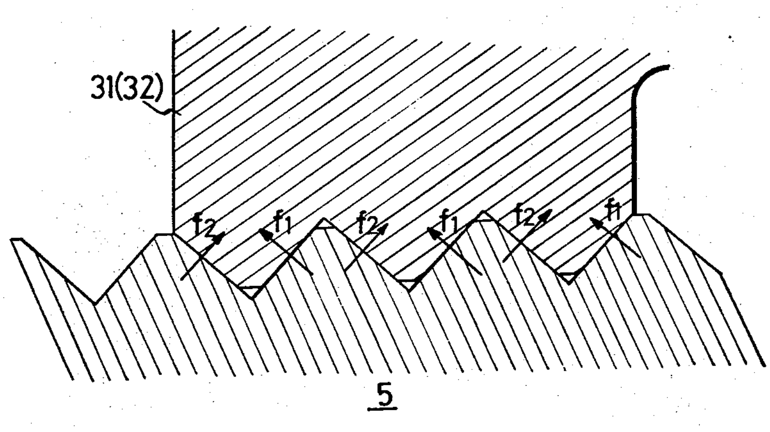
FIG. 9 is a diagram illustrating the forces acting between the threads of a halfnut and a threaded shaft forming a part of the view shown in FIG. 6.

In the facsimile transmitter, when a blank area bearing no information is detected on the original to be transmitted, a signal is applied to the electromagnet 28 to energize it. As a consequence of such energization, the head 4, including the electromagnet 28, is attracted toward the lever 29, which now engages with the threaded shaft 5 though the halfnut 32 as shown in FIG. 6, thus causing the head to pivot toward the lever. In the course of such movement, the halfnut 31 is disengaged from the threaded shaft 5 against the action of the spring 36, turning clockwise about the point 33 to skip one thread on the threaded shaft 5, and to engage with the next following thread thereon where it comes to a stop. In this instance, the halfnuts 31 and 32 will only be subjected to the action of their respective springs 36 and 37, and will be disengaged from the threaded shaft 5 by turning clockwise about their respective points of pivotal connection 33 and 34 against such action. This is because a movement to the right as viewed in FIG. 6 produces a force $f_1$ between the thread of the threaded shaft 5 and the halfnut, as shown in FIG. 9, which causes the halfnut to rotate clockwise about its pivot point. On the other hand, a movement of the halfnut to the left produces a force $f_2$ between the thread and the halfnut, as shown in FIG. 9, and the pivot points 33 and 34 are chosen so that such force causes an increased degree of engagement to be produced between the halfnut and the threaded shaft 5. As a result, when the electromagnet is energized, the halfnut 32 remains stationary while the halfnut 31 moves to the right as viewed in FIG. 6.

When the electromagnet is deenergized, the lever 29 moves away from the electromagnet 28 under the action of the spring 35, whereby the halfnut 32 is disengaged from the threaded shaft 5 against the action of the spring 37, and skips over one pitch of the shaft thread. The above process is repeated so long as blank areas on the original continue, and the printer head 4 continues to be advanced as discussed above, at a faster rate than that of a standard line feed operation.

Normally the halfnut 38 is disengaged from the threaded shaft 5, as shown in FIG. 6. When the head moves close to the lever 29 as a result of the energization of the electromagnet 28, it also moves the halfnut 38. As a consequence, the relative position between the halfnut 38 and the lower extension 29A is varied, causing the halfnut 38 to engage the thread on the threaded shaft 5 under the action of the spring 40. This assures a single pitch skipping operation by the halfnut 31. Subsequently when the lever 29 and the halfnut 32 skip one pitch under the action of the spring 35, the lower extension 29A abuts against the projection 38A of the halfnut 38, disengaging it from the threaded shaft 5. The pitch skipping operation of the halfnut 32 is limited to a single pitch by the abutment of the lever 29 against the right-hand edge of the slit 39A formed in the support plate 39. Thus, the skipping operation is always a one pitch skip, and is repeated as required for a continued blank area. The disclosed invention thus provides an inexpensive feed mechanism for a moving article which produces a skipping operation while retaining a mechanical drive by means of a threaded shaft, and which dispenses with the need for an expensive pulse motor in the drive mechanism.

I claim:

1. A device for moving an article along a feed direction comprising:

a rotatable threaded feed shaft extending along said feed direction;

frame means supporting said article and comprising a first and a second frame member moveable between a spaced-apart position and a close-together position with respect to the feed direction and biased toward one of said positions;

a first and a second half nut pivotally connected to the first and second frame member respectively, each half nut having a threaded portion behind the pivot point thereof as viewed in the feed direction and the pivot point of each half nut being radially outwardly of the shaft in the pivot plane, the threaded portion of each half nut being biased to threadably engage the feed shaft and to move in the feed direction together with the frame member connected thereto as the shaft rotates but pivoting away from the feed shaft when the frame member connected thereto is moved in the feed direction at a rate faster than the feed rate of an engaged half nut; and activating means connecting the frame members to each other and energizable to move the frame members from their biased position to their other position and deenergizable thereafter to allow the frame members to return to their biased position, wherein the distance between the two positions of the frame members corresponds to moving one of the half nuts along a distance of at least one shaft thread;

whereby, when the activating means is energized the frame members move from their bias position to their other position along the feed direction and one of the half nuts skips at least one shaft thread along the feed direction and again engages the feed shaft, and upon subsequently deenergizing the activating means the biasing force between the frame members causes the other half nut to disengage from the feed shaft and to similarly skip at least one shaft thread as the frame members return to their biased position, thereby allowing for moving the article at a steady speed upon steady rotation of the feed shaft and for selectively moving the article faster by selectively energizing and deenergizing the activating means.

2. A device as in claim 1 wherein the frame members are biased toward their spaced-apart position and the first half nut is behind the second half nut as viewed in the feed direction, whereby when the activating means are energized the first frame member moves along the feed direction with respect to the second frame member and the first half nut skips said at least one shaft thread and when the activating means are deenergized the second half nut similarly skips at least one shaft thread in the feed direction while the first half nut is engaging the shaft.

3. A device as in claim 2 including a third half nut pivotally mounted on the first frame member and having a threaded portion biased to threadably engage the feed shaft and means connecting the second frame member and the third half nut for pivoting the threaded portion of the third half nut away from the shaft for disengagement therefrom concurrently with each disengagement of the second half nut from the shaft in the course of each motion of the second frame member in the feed direction toward the biased position of the frame members.

4. A device as in claim 3 including means for selectively disengaging each of the three half nuts from the shaft and for selectively moving the frame members in a direction opposite the feed direction.

5. A device as in claim 4 including a toothed belt extending along the feed direction and having a section running in a direction opposite the feed direction and a pawl pivotally mounted on the frame means and engageable with said run of the belt and means for selectively engaging said belt run with said pawl to thereby selectively move the frame means in a direction opposite the feed direction.

6. A device as in claim 5 wherein said article is a facsimile head and wherein said activating means are repeatedly energized and deenergized in coincidence with blank areas of a facsimile document which is being scanned by the head.

* * * * *